US012469458B2

(12) United States Patent
Shin et al.

(10) Patent No.: US 12,469,458 B2
(45) Date of Patent: Nov. 11, 2025

(54) METHOD OF SETTING A PANEL VOLTAGE AND DISPLAY DEVICE INCORPORATING THE METHOD

(71) Applicant: Samsung Display Co., Ltd., Yongin-Si (KR)

(72) Inventors: Hyori Shin, Yongin-si (KR); Minji Lee, Yongin-si (KR); Hyungjun An, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 1 day.

(21) Appl. No.: 18/244,642

(22) Filed: Sep. 11, 2023

(65) Prior Publication Data

US 2024/0185790 A1 Jun. 6, 2024

(30) Foreign Application Priority Data

Dec. 6, 2022 (KR) ........................ 10-2022-0168999

(51) Int. Cl.
*G09G 3/32* (2016.01)
*G09G 3/3241* (2016.01)
*G09G 3/3258* (2016.01)

(52) U.S. Cl.
CPC ......... *G09G 3/3241* (2013.01); *G09G 3/3258* (2013.01); *G09G 2310/0245* (2013.01); *G09G 2310/0248* (2013.01); *G09G 2310/0262* (2013.01); *G09G 2320/0214* (2013.01)

(58) Field of Classification Search
CPC .. G09G 3/3266; G09G 3/3233; G09G 3/3241; G09G 3/3258; G09G 2310/0245; G09G 2310/0248; G09G 2310/0262; G09G 2320/0214
See application file for complete search history.

(56) References Cited

U.S. PATENT DOCUMENTS

2022/0051627 A1* 2/2022 Yang .................... G09G 3/3233
2022/0310017 A1* 9/2022 Yang .................... G09G 3/3241
2022/0406253 A1* 12/2022 Yuan .................... G09G 3/3233
2023/0110320 A1* 4/2023 Shin .................... G09G 3/3233
345/691

FOREIGN PATENT DOCUMENTS

KR 10-1082168 B1 11/2011
KR 10-1577907 B1 12/2015
KR 10-2033616 B1 10/2019

* cited by examiner

*Primary Examiner* — Michael A Faragalla
(74) *Attorney, Agent, or Firm* — Innovation Counsel LLP

(57) ABSTRACT

A method includes setting a first reference voltage, a second reference voltage lower than the first reference voltage and higher than a panel default voltage, and a reference current, applying the first reference voltage to the pixels, obtaining a first measurement current by measuring a current of the display panel generated in response to the first reference voltage, comparing the first measurement current with the reference current, obtaining a second measurement current by measuring a current of the display panel generated in response to the second reference voltage when the first measurement current is greater than the reference current, comparing the second measurement current with the reference current, and obtaining a panel setting voltage based on the first reference voltage and the second reference voltage when the second measurement current is less than or equal to the reference current.

19 Claims, 13 Drawing Sheets

410

VPS = VPD − VR1 + VR2

420

VPS = VPD + VR1 − VR2

METHOD OF SETTING A PANEL VOLTAGE AND DISPLAY DEVICE INCORPORATING THE METHOD

This application claims priority under 35 USC § 119 to Korean Patent Application No. 10-2022-0168999 filed on Dec. 6, 2022 in the Korean Intellectual Property Office (KIPO), the entire disclosure of which is incorporated by reference herein.

BACKGROUND

1. Field

Embodiments of the present inventive concept relate to a method of setting a panel voltage and a display device performing the same. More particularly, embodiments of the present inventive concept relate to a method of setting a panel voltage and a display device performing the same for enhancing display quality by compensating for a gate-source voltage of a transistor in a pixel.

2. Description of the Related Art

Generally, a display device may include a display panel and a display panel driver. A display panel includes gate lines, data lines, emission lines and pixels. The display panel driver may include a gate driver for providing gate signals to the gate lines, a data driver for providing data voltages to the data lines, and an emission driver for providing emission signals to the emission lines. The display panel driver may include a power supply voltage generator for outputting a power supply voltage to the display panel. The display panel driver may include a driving controller for controlling the gate driver, the data driver and the emission driver, and the power supply voltage generator.

Generally, each of the pixels included in the display device may include a light emitting element, a storage capacitor, a driving transistor, a compensation transistor, and a gate initialization transistor. When a margin of a gate-source voltage of a transistor is insufficient, a leakage current may flow through the transistor even when the transistor is turned off. A voltage of the storage capacitor (e.g., a voltage of a gate electrode of the driving transistor) may change due to the leakage current. Therefore, the display quality of the display device may deteriorate.

SUMMARY

Embodiments of the present inventive concept provide a method of setting a panel voltage to minimize deterioration of display quality due to current leakage.

Embodiments of the present inventive concept provide a display device incorporating the method of setting a panel voltage.

In an embodiment of a method of setting a panel voltage according to the present inventive concept, the method includes setting a first reference voltage, a second reference voltage lower than the first reference voltage and higher than a panel default voltage, and a reference current, applying the first reference voltage to the pixels, obtaining a first measurement current by measuring a current of the display panel generated in response to the first reference voltage, comparing the first measurement current with the reference current, obtaining a second measurement current by measuring a current of the display panel generated in response to the second reference voltage when the first measurement current is greater than the reference current, comparing the second measurement current with the reference current, and obtaining a panel setting voltage based on the first reference voltage and the second reference voltage when the second measurement current is less than or equal to the reference current.

In an embodiment, a leakage current of the pixels when the panel setting voltage may be applied to the display panel is smaller than a leakage current of the pixels when the panel default voltage is applied to the display panel.

In an embodiment, the method may further include apply the panel default voltage to the display panel when the first measurement current is less than or equal to the reference current.

In an embodiment, the method may further include reset the second reference voltage when the second measurement current is greater than the reference current.

In an embodiment, the second reference voltage after resetting may be lower than the second reference voltage before resetting.

In an embodiment, each of the pixels may include a first electrode connected to a first node, a first transistor including a gate electrode connected to a second node, and a second electrode connected to a third node, a second transistor including a second gate electrode receiving a first gate signal, a third electrode connected to a data line, and a fourth electrode connected to the first node, a third transistor including a third gate electrode receiving a second gate signal, a fifth electrode connected to the third node, and a sixth electrode connected to the second node, a fourth transistor including a fourth gate electrode receiving a third gate signal, a seventh electrode receiving a first initialization voltage, and an eighth electrode connected to the second node, a fifth transistor including a fifth gate electrode receiving an emission signal, a ninth electrode receiving a first power supply voltage, and a tenth electrode connected to the first node, a sixth transistor including a sixth gate electrode receiving the emission signal, an eleventh electrode connected to the third node, and a twelfth electrode connected to a fourth node, a seventh transistor including a seventh gate electrode receiving a fourth gate signal, a thirteenth electrode receiving a second initialization voltage, and a fourteenth electrode connected to the fourth node, an eighth transistor including an eighth gate electrode receiving the fourth gate signal, a fifteenth electrode receiving a bias voltage, and a sixteenth electrode connected to the first node, a storage capacitor including a seventeenth electrode receiving the first power supply voltage and an eighteenth electrode connected to the second node, and a light emitting element including a nineteenth electrode connected to the fourth node and a twentieth electrode receiving a second power supply voltage lower than the first power supply voltage.

In an embodiment, the third transistor and the fourth transistor may be n-channel metal oxide semiconductor (NMOS) transistors.

In an embodiment, the first reference voltage and the second reference voltage may be voltages obtained by subtracting a voltage of the fifth electrode of the third transistor from a voltage of the third gate electrode of the third transistor.

In an embodiment, the first reference voltage and the second reference voltage may be voltages obtained by subtracting a voltage of the seventh electrode of the fourth transistor from a voltage of the fourth gate electrode of the fourth transistor.

In an embodiment, the panel setting voltage may be determined by using an equation VPS=VPD−VR1+VR2. VPS represents the panel setting voltage, VPD represents the panel default voltage, VR1 represents the first reference voltage, and the VR2 represents the second reference voltage.

In an embodiment, the panel setting voltage may be applied to the gate electrode of one of the third transistor and the gate electrode of the fourth transistor.

In an embodiment, the panel default voltage may be a voltage of the second gate signal having a deactivation level or a voltage of the third gate signal having the deactivation level.

In an embodiment, the panel setting voltage may be determined by using an equation VPS=VPD+VR1−VR2. VPS represents the panel setting voltage, VPD represents the panel default voltage, VR1 represents the first reference voltage, and the VR2 represents the second reference voltage.

In an embodiment, the panel setting voltage may be applied to a fifth electrode of the third transistor.

In an embodiment, the panel default voltage may be the second power supply voltage.

In an embodiment, the panel setting voltage may be applied to a seventh electrode of the fourth transistor.

In an embodiment, the panel default voltage may be the first initialization voltage.

In an embodiment of a display device according to the present inventive concept, the display device includes a display panel including pixels and a display panel driver configured to set a first reference voltage, a second reference voltage lower than the first reference voltage and higher than a panel default voltage, and a reference current, to apply the first reference voltage to the pixels, to obtain a first measurement current by measuring a current of the display panel generated in response to the first reference voltage, to compare the first measurement current with the reference current, to obtain a second measurement current by measuring a current of the display panel generated in response to the second reference voltage when the first measurement current is greater than the reference current, to compare the second measurement current with the reference current, and to obtain a panel setting voltage based on the first reference voltage and the second reference voltage when the second measurement current is less than or equal to the reference current.

In an embodiment, a leakage current of the pixels when the panel setting voltage is applied to the display panel may be smaller than a leakage current of the pixels when the panel default voltage is applied to the display panel.

In an embodiment, each of the pixels may include a first transistor including a first electrode connected to a first node, a gate electrode connected to a second node, and a second electrode connected to a third node, a second transistor including a second gate electrode receiving a first gate signal, a third electrode connected to a data line, and a fourth electrode connected to the first node, a third transistor including a third gate electrode receiving a second gate signal, a fifth electrode connected to the third node, and a sixth electrode connected to the second node, a fourth transistor including a fourth gate electrode receiving a third gate signal, a seventh electrode receiving a first initialization voltage, and an eighth electrode connected to the second node, a fifth transistor including a fifth gate electrode receiving an emission signal, a ninth electrode receiving a first power supply voltage, and a tenth electrode connected to the first node, a sixth transistor including a sixth gate electrode receiving the emission signal, an eleventh electrode connected to the third node, and a twelfth electrode connected to a fourth node, a seventh transistor including a seventh gate electrode receiving a fourth gate signal, a thirteenth electrode receiving a second initialization voltage, and a fourteenth electrode connected to the fourth node, an eighth transistor including an eighth gate electrode receiving the fourth gate signal, a fifteenth electrode receiving a bias voltage, and a sixteenth electrode connected to the first node, a storage capacitor including a seventeenth electrode receiving the first power supply voltage and an eighteenth electrode connected to the second node, and a light emitting element including a nineteenth electrode connected to the fourth node and a twentieth electrode receiving a second power supply voltage lower than the first power supply voltage.

According to the method of setting the panel voltage and the display device performing the same according to the embodiments, the method and the display device may set the first reference voltage, the second reference voltage, and the reference current, may compare the first measurement current generated in response to the first reference voltage and the second measurement current generated in response to the second reference voltage with the reference current, may set the panel setting voltage based on the first reference voltage and the second reference voltage, and may apply the panel setting voltage to the transistor in the pixel. Accordingly, an insufficient margin of a gate-source voltage of the transistor may be prevented, and even when the transistor is turned off, a leakage current flowing through the transistor may be minimized, so that a display quality of the display device may be enhanced.

BRIEF DESCRIPTION OF THE DRAWINGS

The above and other features of embodiments of the present inventive concept will become more apparent by describing in detailed embodiments thereof with reference to the accompanying drawings, in which.

DETAILED DESCRIPTION OF THE EMBODIMENTS

Hereinafter, embodiments of the present inventive concept will be described in detail with reference to the accompanying drawings.

Figure 1:
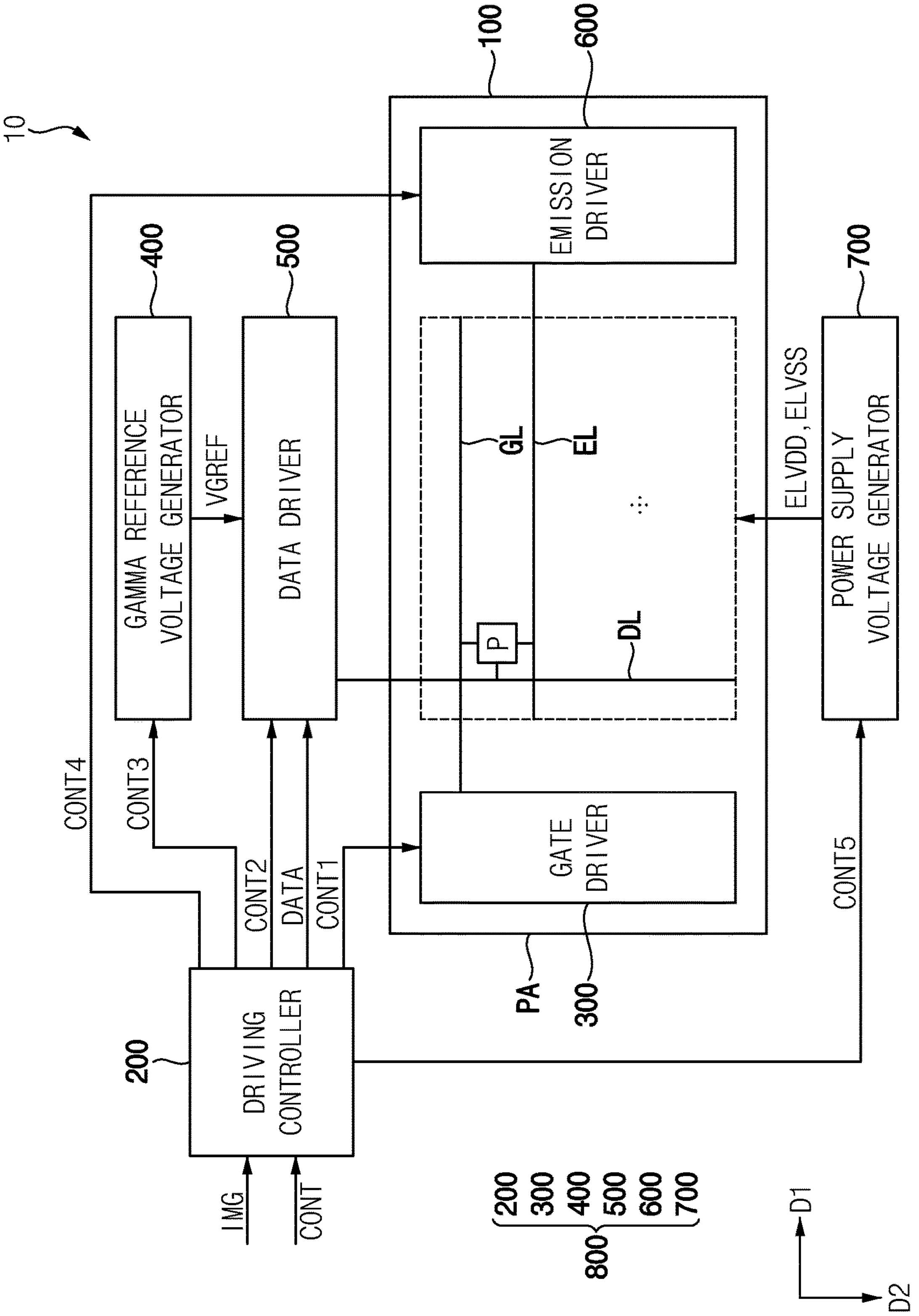
FIG. 1 is a block diagram illustrating a display device according to embodiments.

FIG. 1 is a block diagram illustrating a display device 10 according to embodiments.

Referring to FIG. 1, a display device 10 may include a display panel 100 and a display panel driver 800. The display panel driver 800 may include a driving controller 200, a gate driver 300, a gamma reference voltage generator 400, a data driver 500, an emission driver 600, and a power supply voltage generator 700.

For example, the driving controller 200 and the data driver 500 may be integrally formed. For example, the driving controller 200, the gamma reference voltage generator 400, and the data driver 500 may be integrally formed. For example, the driving controller 200, the gamma reference voltage generator 400, the data driver 500, and the emission driver 600 may be integrally formed. For example, the driving controller 200, the gamma reference voltage generator 400, the data driver 500, the emission driver 600, and the power supply voltage generator 700 may be integrally formed. A driving module including at least the driving controller 200 and the data driver 500 which are integrally formed may be referred to as a timing controller embedded data driver (TED).

For example, the display panel 100 may be an organic light emitting diode display panel including organic light emitting diodes. For example, the display panel 100 may be a quantum-dot organic light emitting diode display panel including organic light emitting diodes and quantum-dot color filters. For example, the display panel 100 may be a quantum-dot nano light emitting diode display panel including nano light emitting diodes and quantum-dot color filters.

The display panel 100 may include a display region displaying an image and a peripheral region disposed adjacent to the display region.

The display panel 100 may include gate lines GL, data lines DL, emission lines EL, and pixels P electrically connected to the gate lines GL, the data lines DL, and the emission lines EL.

The driving controller 200 may receive input image data IMG and an input control signal CONT from an external host processor (e.g., a graphics processing unit (GPU), an application processor, or a graphics card). For example, the input image data IMG may include red image data, green image data, and blue image data. The input image data IMG may include white image data. The input image data IMG may include magenta image data, yellow image data, and cyan image data. The input control signal CONT may include a master clock signal and a data enable signal. The input control signal CONT may further include a vertical synchronization signal and a horizontal synchronization signal.

The driving controller 200 may generate a first control signal CONT1, a second control signal CONT2, a third control signal CONT3, a fourth control signal CONT4, a fifth control signal CONT5, and a data signal DATA based on the input image data IMG and the input control signal CONT.

The driving controller 200 may generate the first control signal CONT1 for controlling an operation of the gate driver 300 based on the input control signal CONT, and output the first control signal CONT1 to the gate driver 300. The first control signal CONT1 may include a vertical start signal and a gate clock signal.

The driving controller 200 may generate the second control signal CONT2 for controlling an operation of the data driver 500 based on the input control signal CONT, and output the second control signal CONT2 to the data driver 500. The second control signal CONT2 may include a horizontal start signal and a load signal.

The driving controller 200 may generate the data signal DATA based on the input image data IMG. The driving controller 200 may output the data signal DATA to the data driver 500.

The driving controller 200 may generate the third control signal CONT3 for controlling an operation of the gamma reference voltage generator 400 based on the input control signal CONT, and output the third control signal CONT3 to the gamma reference voltage generator 400.

The driving controller 200 may generate the fourth control signal CONT4 for controlling an operation of the emission driver 600 based on the input control signal CONT, and output the fourth control signal CONT4 to the emission driver 600.

The gate driver 300 may generate gate signals for driving the gate lines GL in response to the first control signal CONT1 received from the driving controller 200. The gate driver 300 may output the gate signals to the gate lines GL.

In an embodiment, the gate driver 300 may be integrated on the peripheral region PA of the display panel 100.

The gamma reference voltage generator 400 may generate a gamma reference voltage VGREF in response to the third control signal CONT3 received from the driving controller 200. The gamma reference voltage generator 400 may provide the gamma reference voltage VGREF to the data driver 500. The gamma reference voltage VGREF may have a value corresponding to each data signal DATA.

In an embodiment, the gamma reference voltage generator 400 may be disposed in the driving controller 200 or in the data driver 500.

The data driver 500 may receive the second control signal CONT2 and the data signal DATA from the driving controller 200, and receive the gamma reference voltage VGREF from the gamma reference voltage generator 400. The data driver 500 may convert the data signal DATA into the data voltage in analog form using the gamma reference voltage VGREF. The data driver 500 may output the data voltage to the data line DL.

The emission driver 600 may generate emission signals for driving the emission lines EL in response to the fourth control signal CONT4 received from the driving controller 200. The emission driver 600 may output the emission signals to the emission lines EL.

The power supply voltage generator 700 may generate a first power supply voltage ELVDD, and output the first power supply voltage ELVDD to the display panel 100. The power supply voltage generator 700 may generate a second power supply voltage ELVSS, and output the second power supply voltage ELVSS to the display panel 100. The power supply voltage generator 700 may generate a gate driving voltage for driving the gate driver 300, output the gate driving voltage to the gate driver 300, generate a data driving voltage for driving the data driver 500, and output the data driving voltage to the data driver 500. The first power supply voltage ELVDD may be a high power supply voltage applied to the pixels P of the display panel 100, and the second power supply voltage ELVSS may be a low power supply voltage applied to the pixels P of the display panel 100.

Figure 2:
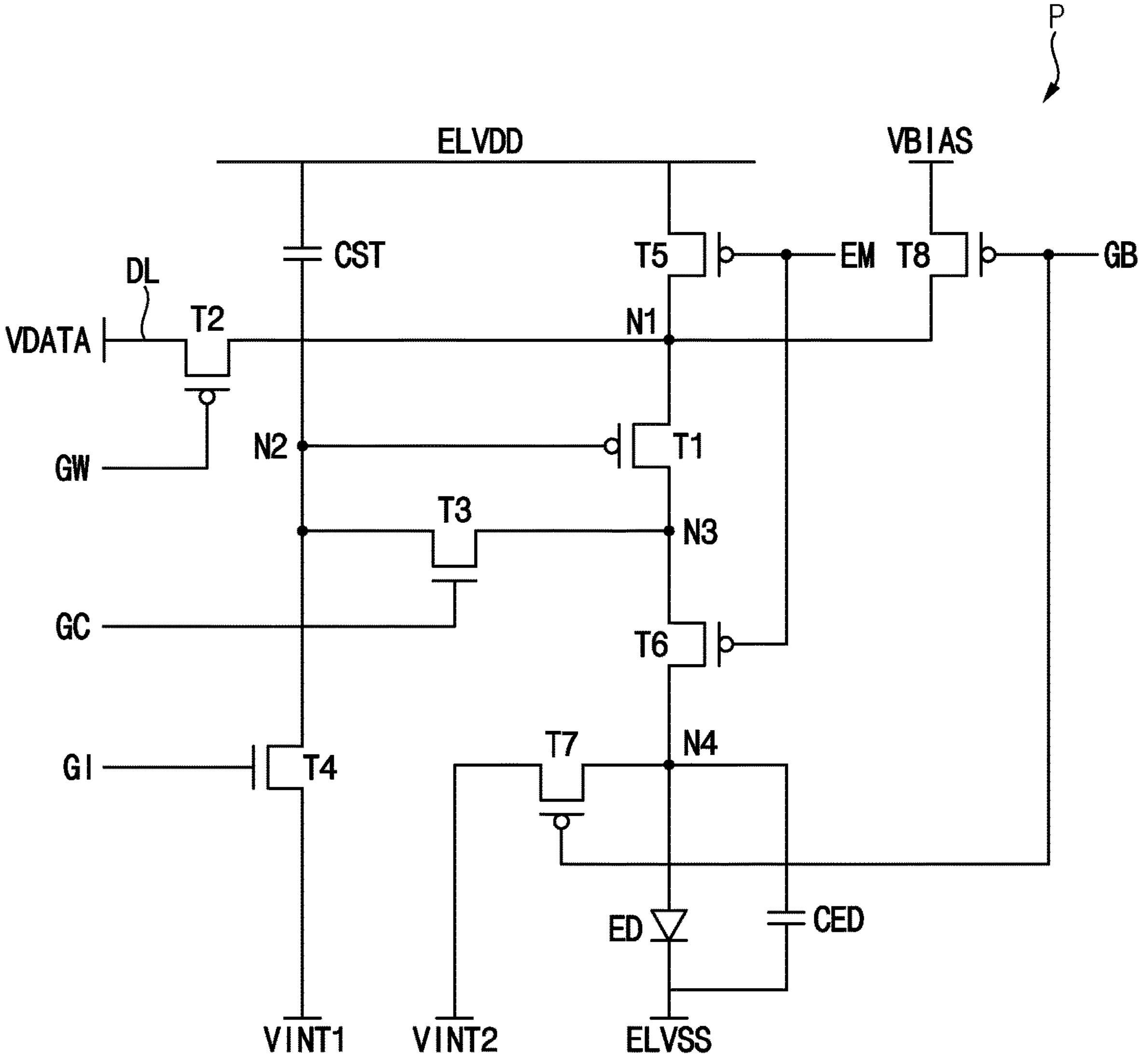
FIG. 2 is a circuit diagram illustrating an example of a pixel of FIG. 1.

FIG. 2 is a circuit diagram illustrating an example of a pixel P of FIG. 1.

Referring to FIGS. 1 and 2, the pixel P of FIG. 2 may include a first capacitor C1, a second capacitor C2, a first transistor T1, a second transistor T2, and a third transistor T3, a fourth transistor T4, a fifth transistor T5, a sixth transistor T6, a seventh transistor T7, an eighth transistor T8, a storage capacitor CST, and a light emitting element ED.

The first transistor T1 may generate a driving current based on a voltage of a second node N2, that is, a voltage of a second electrode of the storage capacitor CST. In an embodiment, the first transistor T1 may include a gate electrode connected to the second node N2, a first electrode connected to a first node N1, and a second electrode connected to a third node N3. The first electrode of the first transistor T1 may be a source electrode, and the second electrode of the first transistor T1 may be a drain electrode.

The second transistor T2 may provide the data voltage VDATA of the data line DL to the first node N1 in response to a first gate signal GW. In an embodiment, the second transistor T2 may include a second gate electrode receiving the first gate signal GW, a third electrode connected to the data line DL, and a fourth electrode connected to the first node N1. The third electrode of the second transistor T2 may be the source electrode, and the fourth electrode of the second transistor T2 may be the drain electrode.

The third transistor T3 may diode-connect the first transistor T1 in response to a second gate signal GC. In an embodiment, the third transistor T3 includes a third gate electrode receiving the second gate signal GC, a fifth electrode connected to the third node N3, and a sixth electrode connected to the second node N2. The fifth electrode of the third transistor T3 may be the source electrode, and the sixth electrode of the third transistor T3 may be the drain electrode.

The fourth transistor T4 may provide a first initialization voltage VINT1 to the second node N2 in response to a third gate signal GI. In an embodiment, the fourth transistor T4 includes a fourth gate electrode receiving the third gate signal GI, a seventh electrode receiving the first initialization voltage VINT1, and an eighth electrode connected to the second node N2. The sixth electrode of the fourth transistor T4 may be the source electrode, and the seventh electrode of the fourth transistor T4 may be the drain electrode.

The fifth transistor T5 may provide the first power supply voltage ELVDD to the first node N1 in response to the emission signal EM. In an embodiment, the fifth transistor T5 may include a fifth gate electrode receiving the emission signal EM, a ninth electrode receiving the first power supply voltage ELVDD, and a tenth electrode connected to the first node N1. The ninth electrode of the fifth transistor T5 may be the source electrode, and the tenth electrode of the fifth transistor T5 may be the drain electrode.

The sixth transistor T6 may connect the first transistor T1 and the light emitting element ED in response to the emission signal EM. When the sixth transistor T6 is turned on, the driving current generated by the first transistor T1 may be provided to the light emitting element ED. In an embodiment, the sixth transistor T6 may include a sixth gate electrode receiving the emission signal EM, an eleventh electrode connected to the third node N3, and a twelfth electrode connected to a fourth node N4. The eleventh electrode of the sixth transistor T6 may be the source electrode, and the twelfth electrode of the sixth transistor T6 may be the drain electrode.

The seventh transistor T7 may perform an anode initialization operation of providing a second initialization voltage VINT2 to a nineteenth electrode (i.e., an anode) of the light emitting element ED in response to a fourth gate signal GB. In an embodiment, the seventh transistor T7 may include a seventh gate electrode receiving the fourth gate signal GB, a thirteenth electrode receiving the second initialization voltage VINT2, and a fourteenth electrode connected to the fourth node N4. The thirteenth electrode of the seventh transistor T7 may be the source electrode, and the fourteenth electrode of the seventh transistor T7 may be the drain electrode.

The eighth transistor T8 may provide a bias voltage VBIAS to the first node N1 in response to the fourth gate signal GB. In an embodiment, the eighth transistor T8 may include an eighth gate electrode receiving the fourth gate signal GB, a fifteenth electrode receiving the bias voltage VBIAS, and a sixteenth electrode connected to the first node N1. The fifteenth electrode of the eighth transistor T8 may be the source electrode, and a sixteenth electrode of the eighth transistor T8 may be the drain electrode.

In an embodiment, the third transistor T3 and the fourth transistor T4 may be n-channel metal oxide semiconductor (NMOS) transistors.

The storage capacitor CST may be connected between a line of the first power supply voltage ELVDD and the second node N2. In an embodiment, the storage capacitor CST may include a seventeenth electrode receiving the first power supply voltage ELVDD and an eighteenth electrode connected to the second node N2.

The light emitting element ED may emit light based on the driving current generated by the first transistor T1 while the sixth transistor T6 is turned on. For example, the light emitting element ED may be an organic light emitting diode (OLED), but is not limited thereto. For example, the light emitting element ED may be a nano light emitting diode (NED), a quantum dot (QD) light emitting diode, a micro light emitting diode, an inorganic light emitting diode, or any other suitable light emitting device. The light emitting element ED may include a parasitic capacitor CED formed between the anode of the light emitting element ED and a line of the second power supply voltage ELVSS. The parasitic capacitor CED may be initialized or discharged by the anode initialization operation. In an embodiment, the light emitting element ED may include a nineteenth electrode connected to the fourth node N4 and a twentieth electrode receiving the second power supply voltage ELVSS lower than the first power voltage ELVDD.

Figure 3:
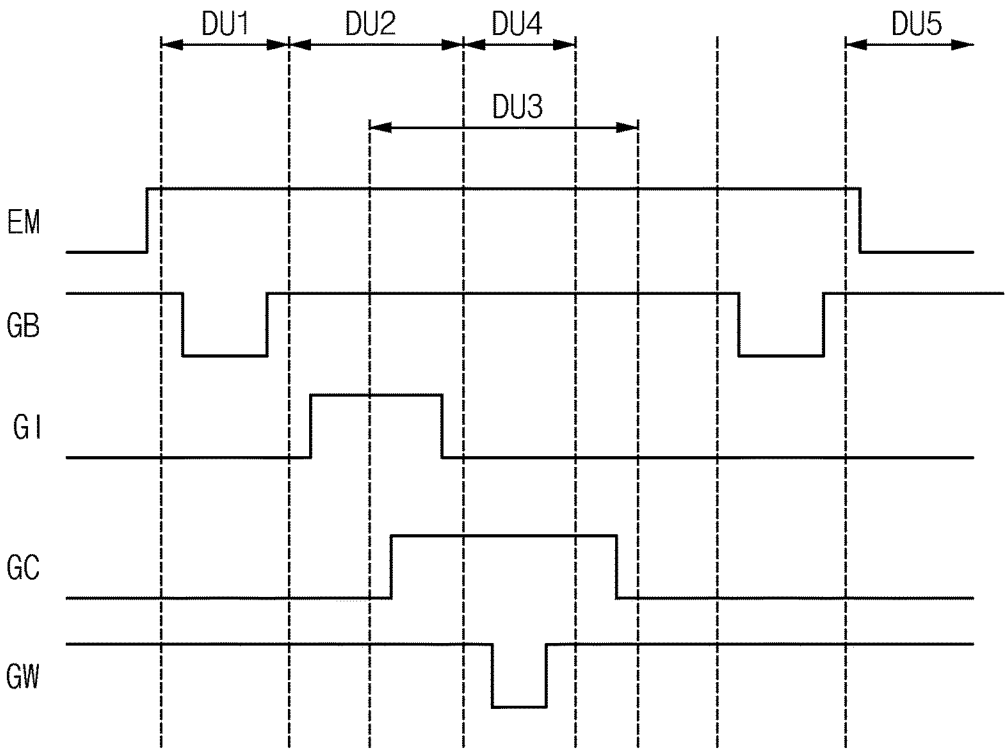
FIG. 3 is a timing diagram illustrating input signals applied to the pixel of FIG. 2.

FIG. 3 is a timing diagram illustrating input signals applied to the pixel P of FIG. 2.

Referring to FIGS. 1 to 3, in a first period DU1, the fourth gate signal GB may have an activation level. For example, the activation level of the fourth gate signal GB may be a low level. When the fourth gate signal GB has the activation level, the seventh transistor T7 may be turned on so that the second initialization voltage VINT2 may be applied to the fourth node N4, the eighth transistor T8 may be turned on, and the bias voltage VBIAS may be applied to the first node N1.

In a second period DU2, the third gate signal GI may have the activation level. For example, the activation level of the third gate signal GI may be a high level. When the third gate signal GI has the activation level, the fourth transistor T4 may be turned on so that the first initialization voltage VINT1 may be applied to the second node N2.

In the third period DU3, the second gate signal GC may have the activation level. For example, the activation level of the second gate signal GC may be the high level. When the second gate signal GC has the activation level, the third transistor T3 may be turned on so that the first initialization voltage VINT1 may be applied to the second node N2.

In a fourth period DU4, the first gate signal GW may have the activation level. For example, the activation level of the first gate signal GW may be the low level. When the first gate signal GW has the activation level, the second transistor T2 is turned on so that the data voltage VDATA may be applied to the first node N1.

In a fifth period DU5, the emission signal EM may have the activation level. For example, the activation level of the emission signal EM may be the low level. When the emission signal EM has the activation level, the fifth transistor T5 and the sixth transistor T6 may be turned on.

The driving current may flow in an order of the fifth transistor T5, the first transistor T1, and the sixth transistor T6 to drive the light emitting element ED. A strength of the driving current may be determined by a level of the data voltage VDATA. A luminance of the light emitting element ED may be determined by the strength of the driving current.

Figure 4:
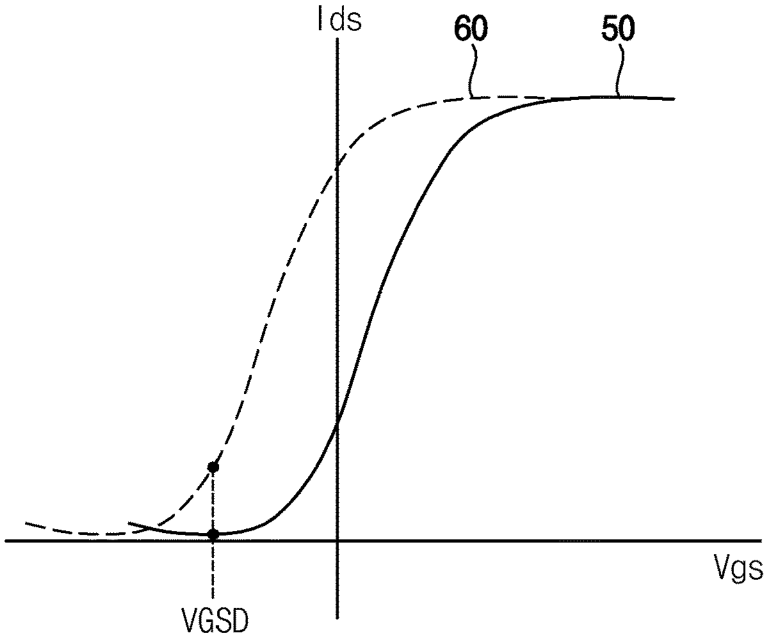
FIG. 4 is a conventional graph illustrating current characteristics according to a gate-source voltage of a transistor of FIG. 2.

FIG. 4 is a conventional graph illustrating current characteristics according to a gate-source voltage of a transistor of FIG. 2.

Referring to FIGS. 1 to 4, the current according to the gate-source voltage of the third transistor T3 and the fourth transistor T4 can be expressed as Equation 1 below.

$$Ids = \frac{1}{2}(\mu Cox)\left(\frac{W}{L}\right)(Vgs - Vth)^2 \quad \text{[Equation 1]}$$

In the Equation 1, u is a mobility of the third transistor T3 or the fourth transistor T4, Cox is a capacitance per unit area of the third transistor T3 or the fourth transistor T4, and W/L is a width-to-length ratio of the third transistor T3 or the fourth transistor T4, Vgs is a voltage between the source electrode and the gate electrode of the third transistor T3 or the fourth transistor T4, and Vth is A threshold voltage of the third transistor T3 or the fourth transistor T4.

Meanwhile, when a margin of a gate-source voltage of a transistor is insufficient, a leakage current may flow through the transistor even when the transistor is turned off.

For example, when a margin of a gate-source voltage of the third transistor T3 or the fourth transistor T4 is insufficient, even if the third transistor T3 or the fourth transistor T4 is turned off, a leakage current is generated by the third transistor T3 or the fourth transistor T4. Therefore, graphs 50 and 60 of a current according to the gate-source voltage of the third transistor T3 or the fourth transistor T4 may be changed.

Figure 5:
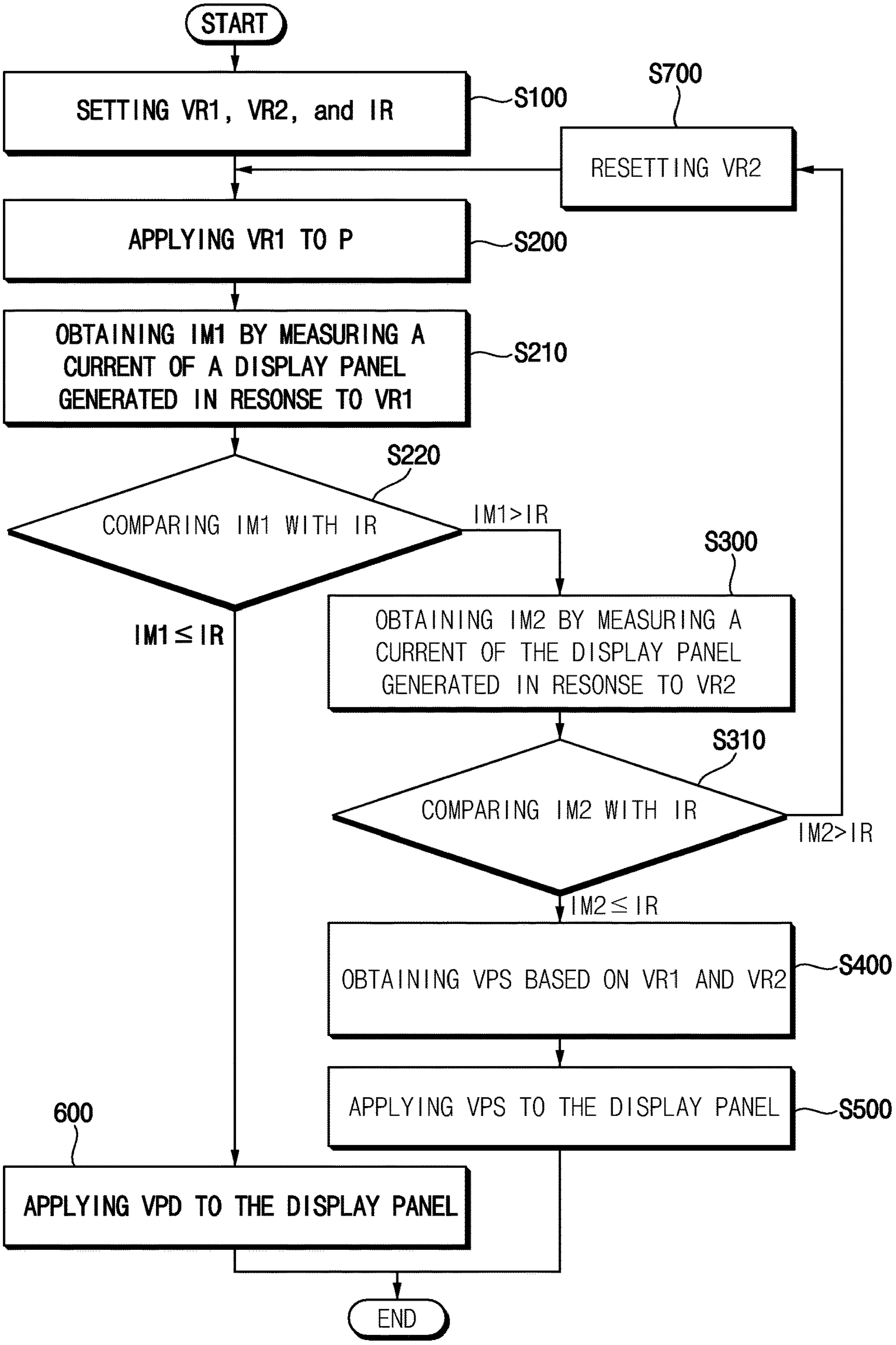
FIG. 5 is a flowchart illustrating a method for setting a panel voltage according to embodiments.
Figure 6A:
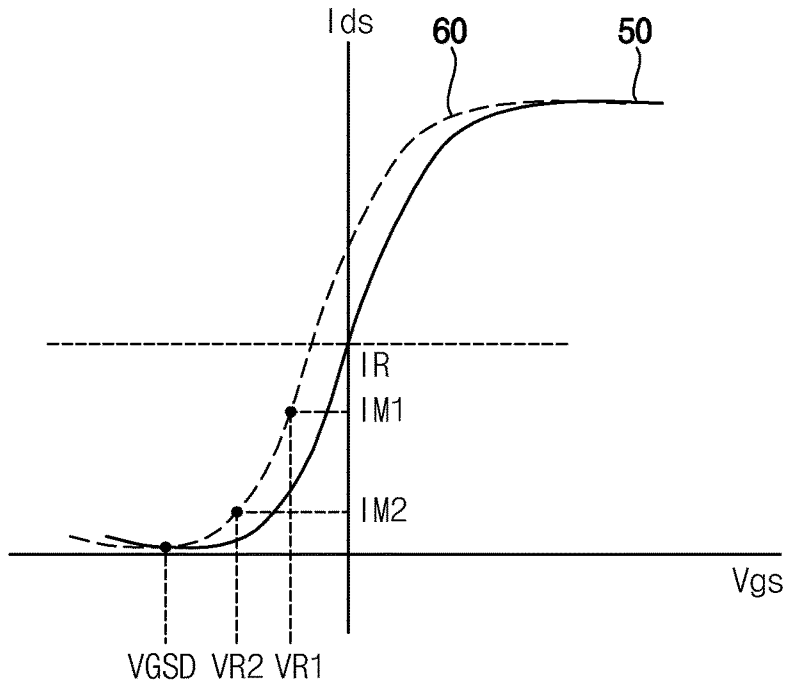
FIGS. 6A to 6C are diagrams illustrating an example of the current characteristics according to the gate-source voltage of the transistor of FIG. 4.
Figure 6B:
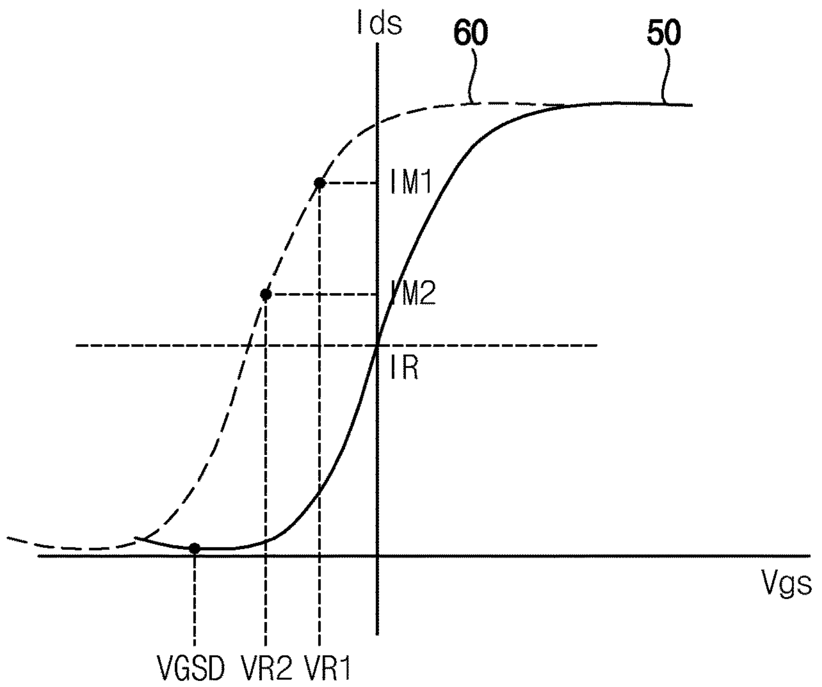
Figures 6C, 7:
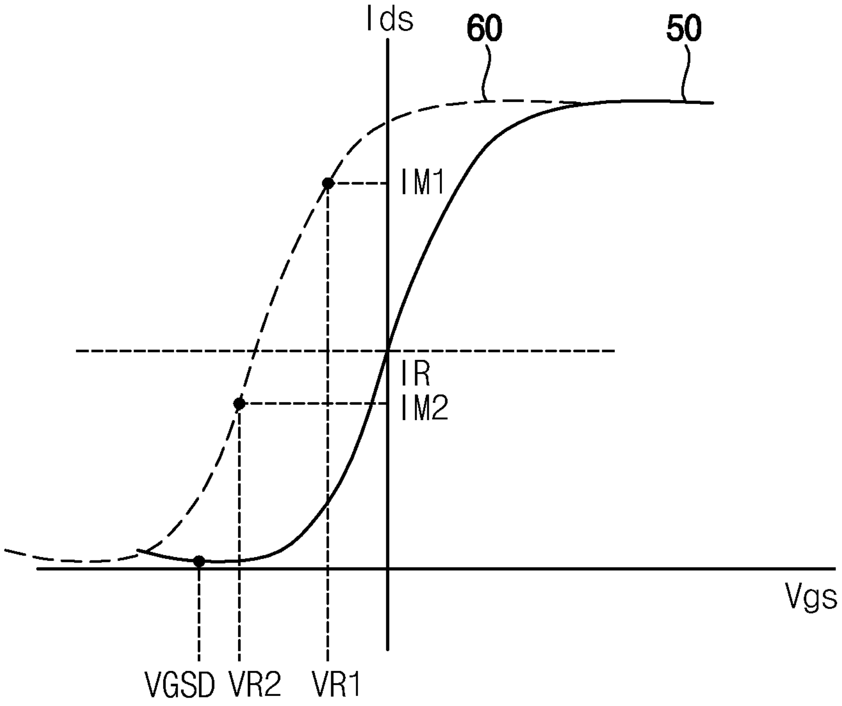
FIG. 7 is a diagram illustrating an example in which a panel default voltage is compensated.
Figure 8A:
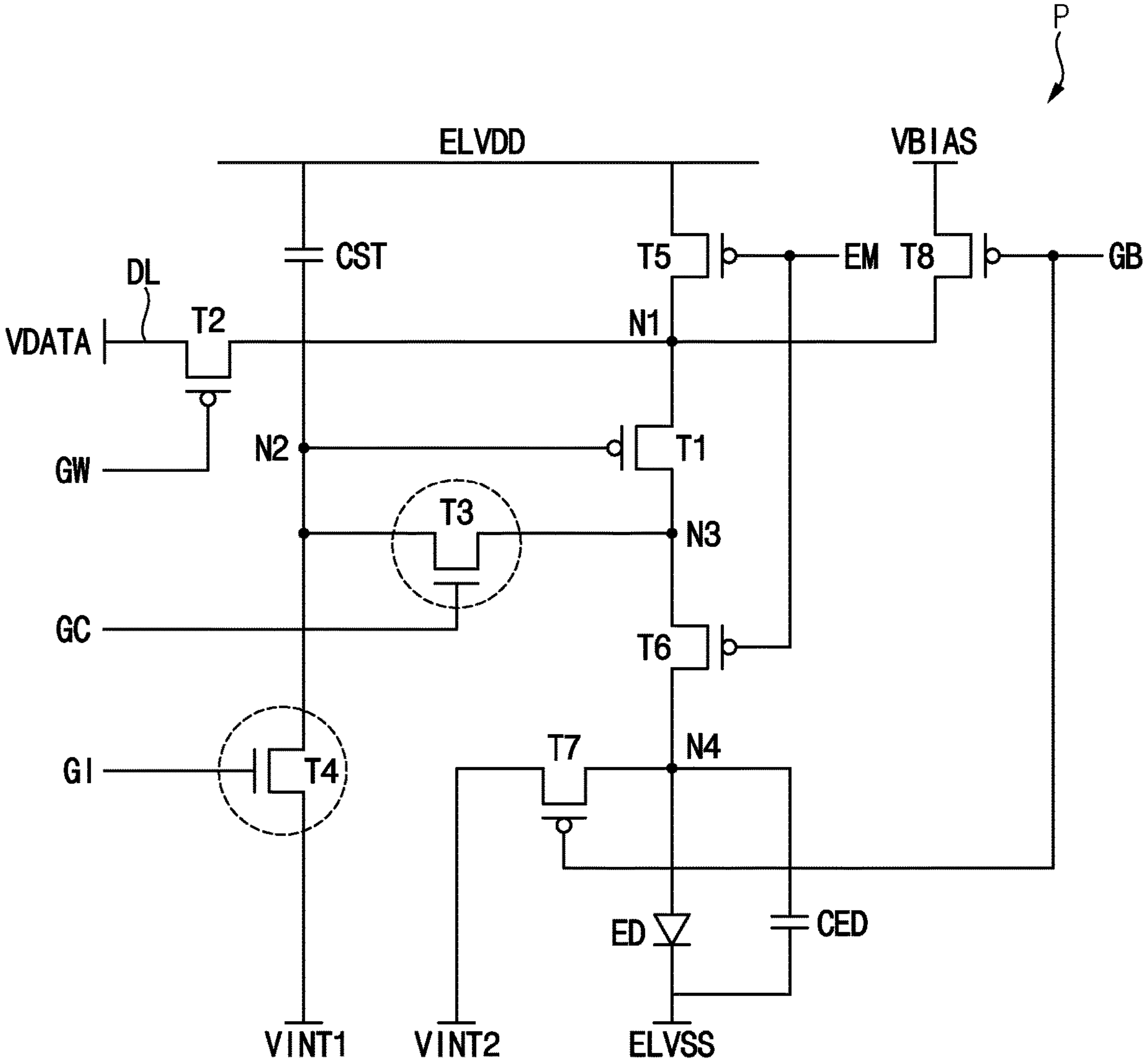
FIGS. 8A and 8B are diagrams illustrating an example in which a panel setting voltage is applied.
Figure 8B:
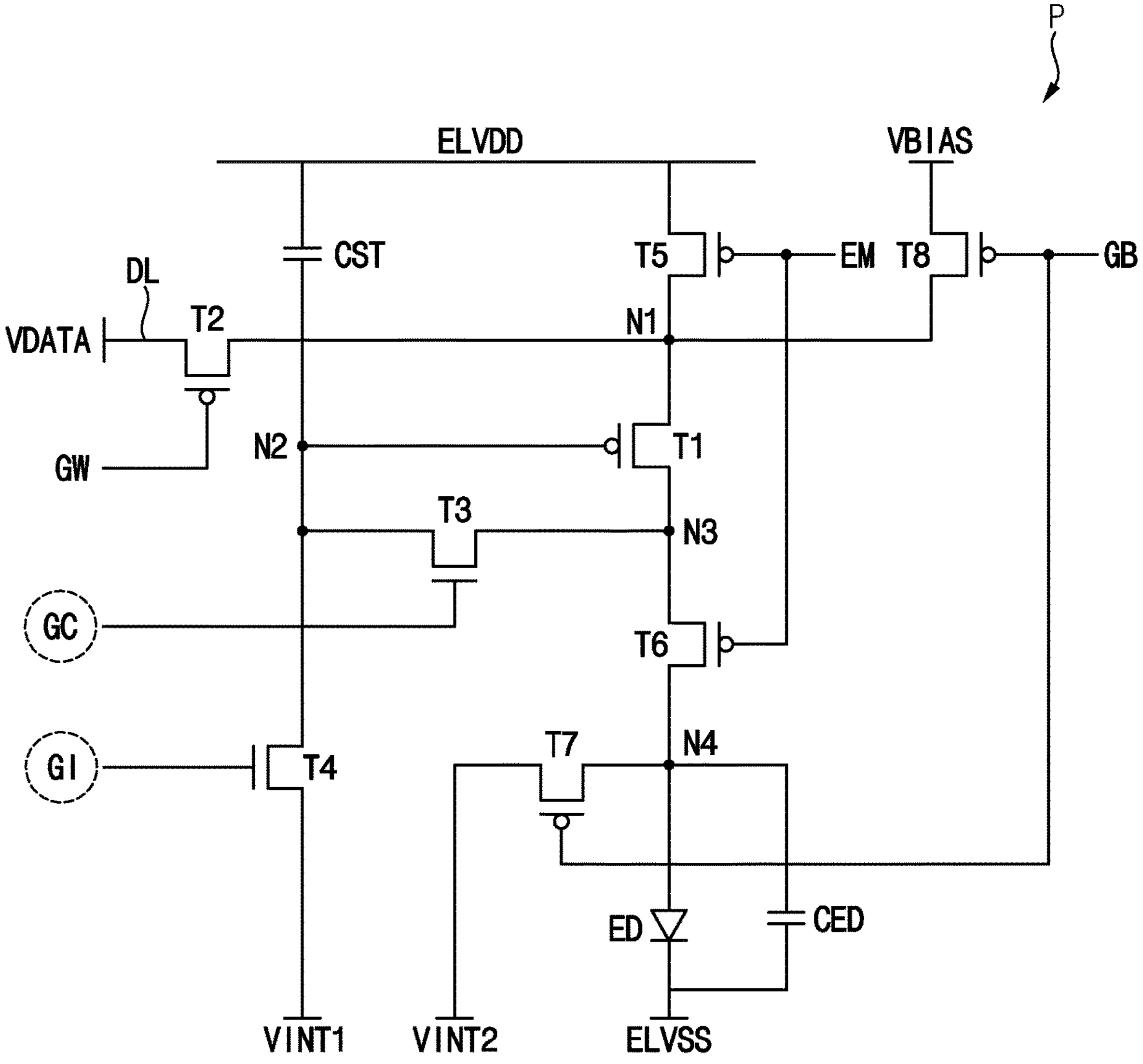
Figure 9A:
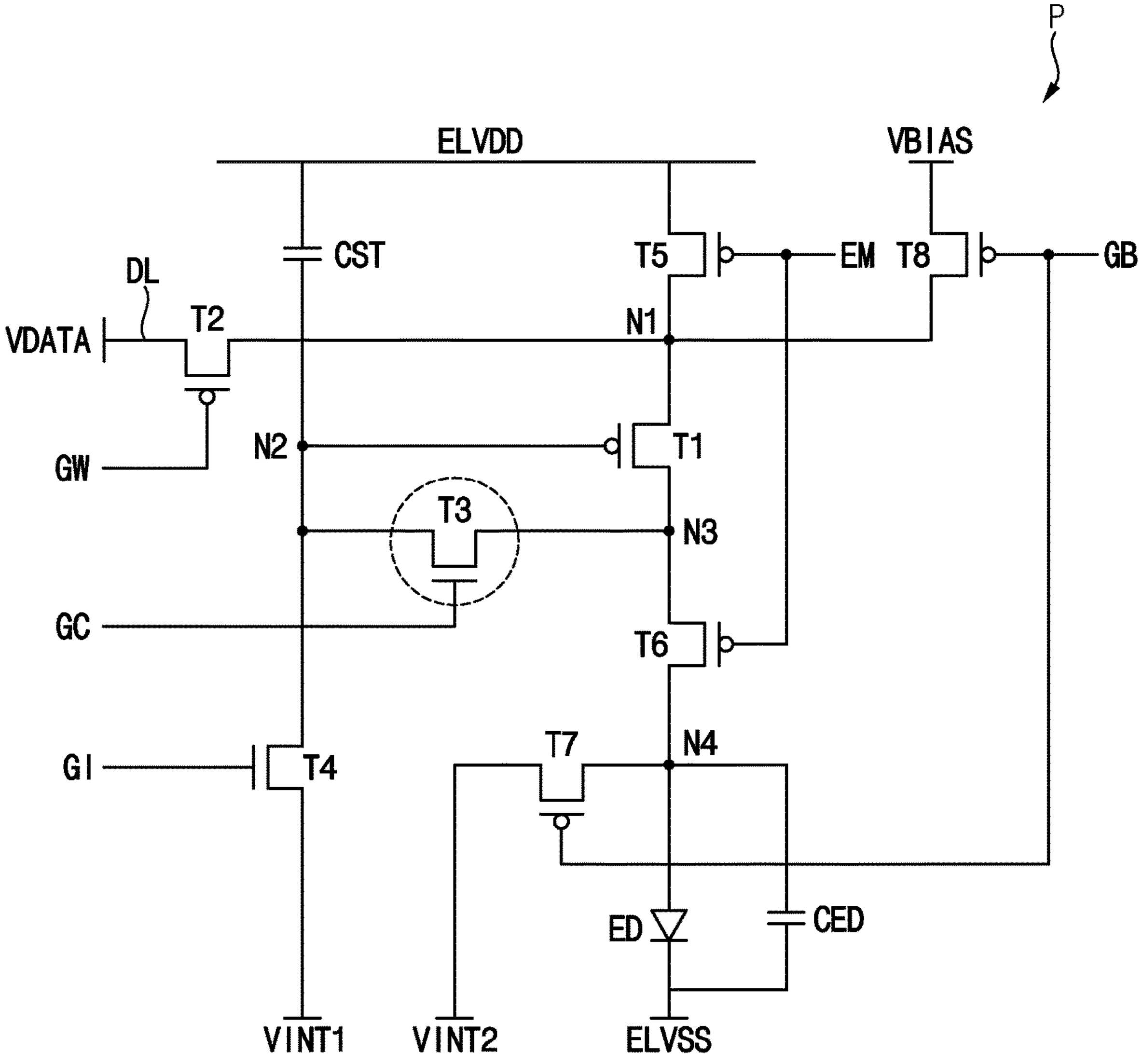
FIGS. 9A and 9B are diagrams illustrating an example in which the panel setting voltage is applied.
Figure 9B:
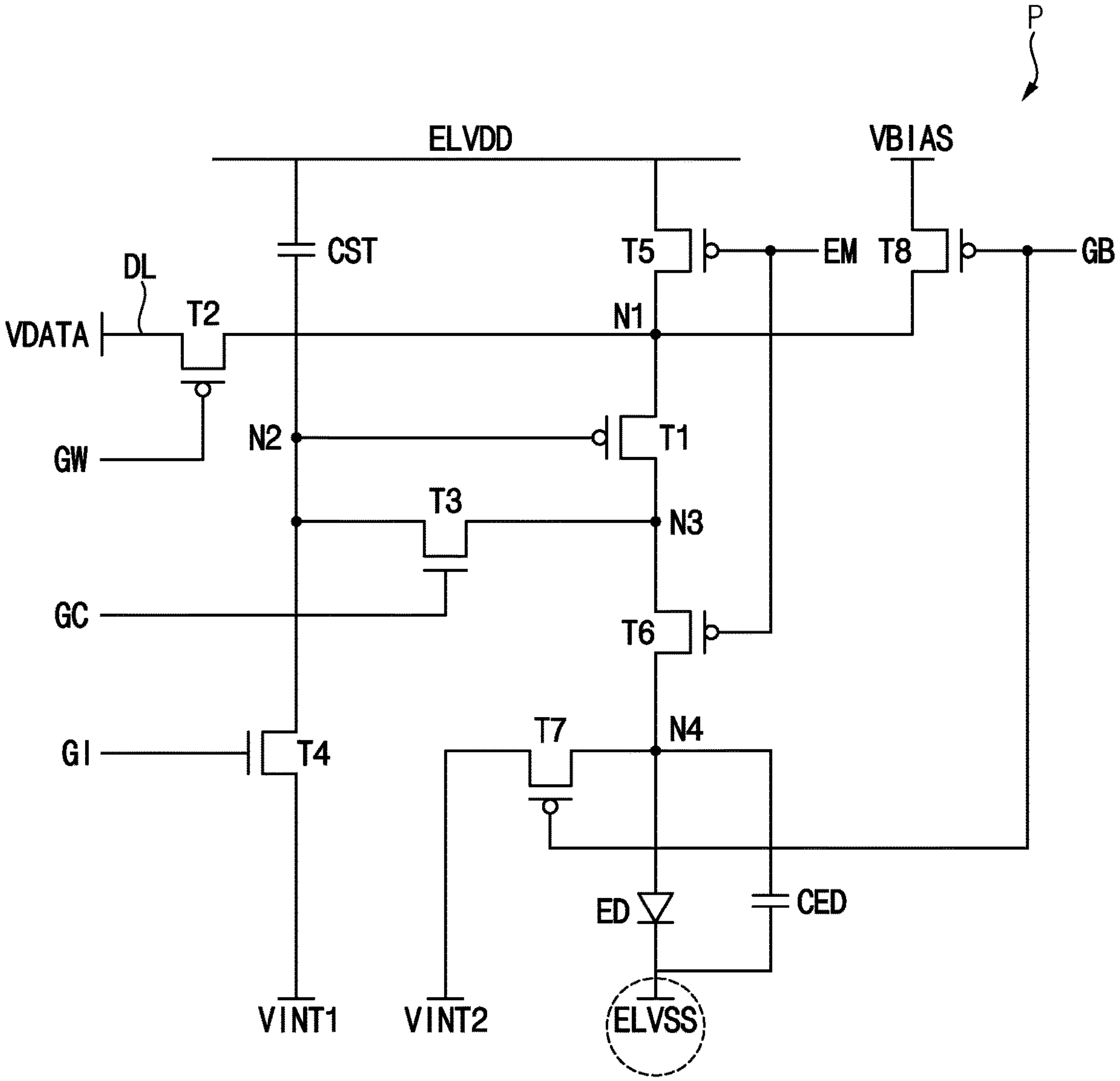
Figure 10A:
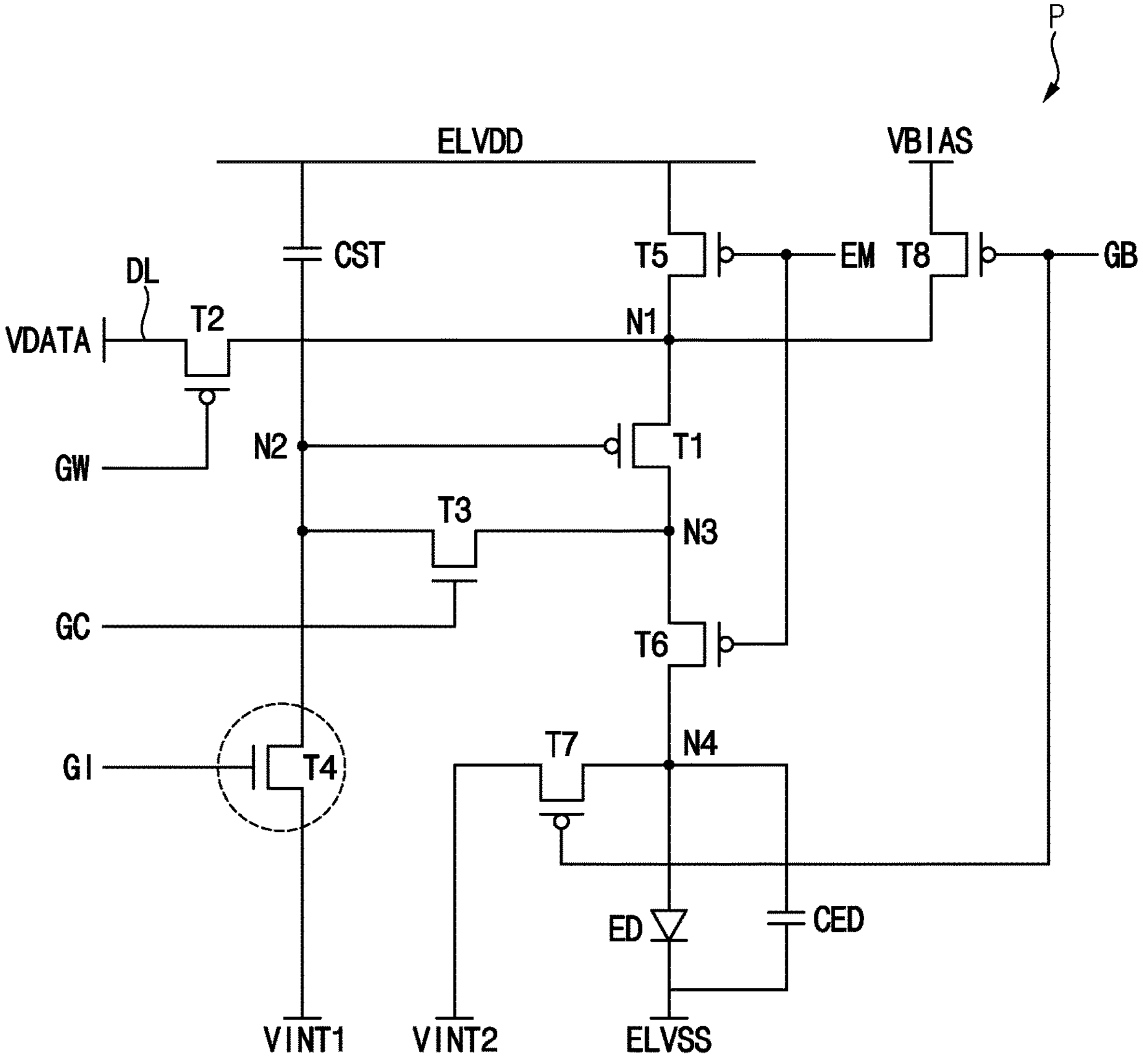
FIGS. 10A and 10B are diagrams illustrating an example in which the panel setting voltage is applied.
Figure 10B:
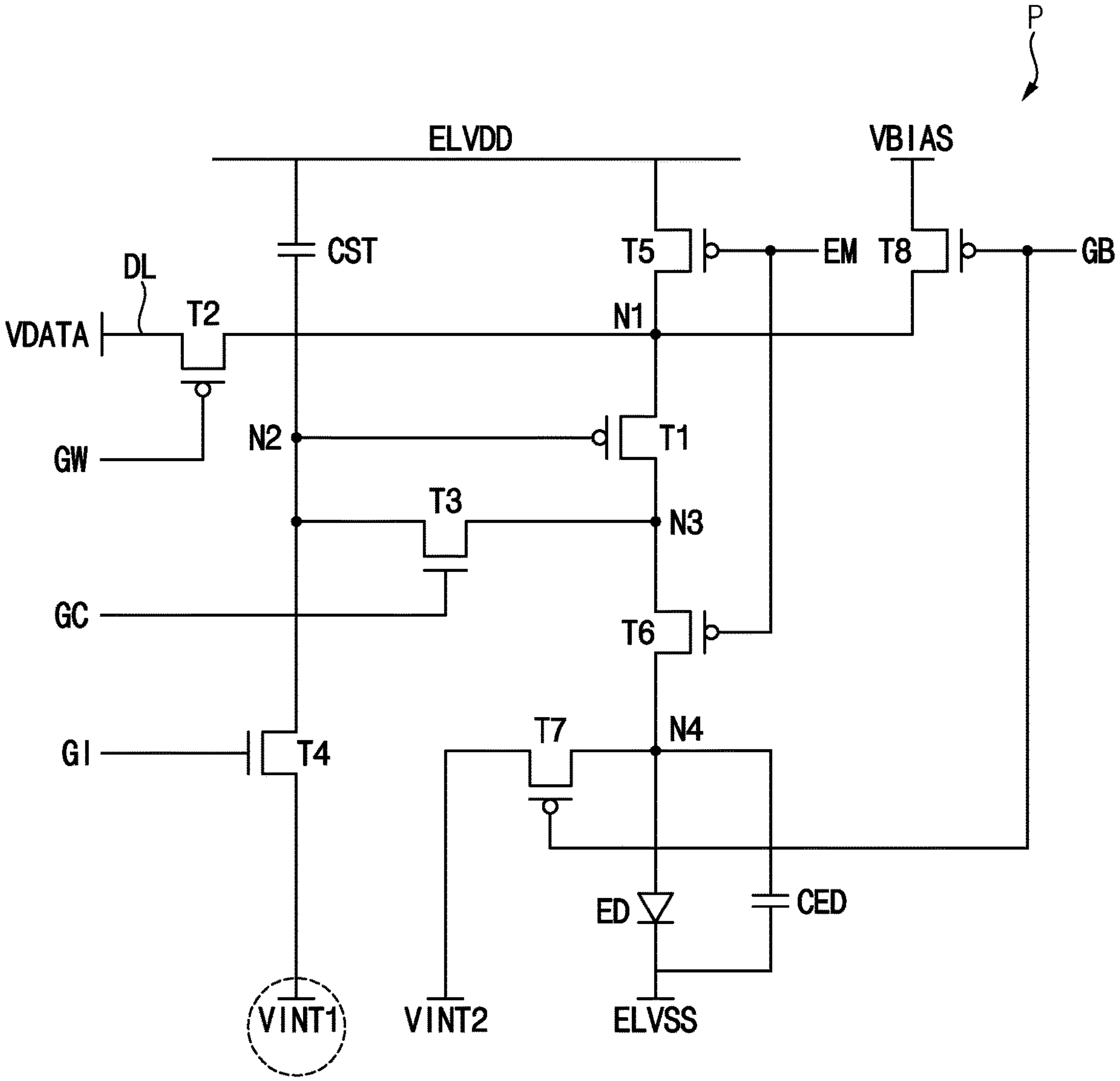

FIG. 5 is a flowchart illustrating a method for setting a panel voltage according to embodiments. FIGS. 6A to 6C are diagrams illustrating an example of the current characteristics according to the gate-source voltage Vgs of the transistor of FIG. 4. FIG. 7 is a diagram illustrating an example in which a panel default voltage VPD is compensated. FIGS. 8A and 8B are diagrams illustrating an example in which a panel setting voltage VPS is applied. FIGS. 9A and 9B are diagrams illustrating an example in which the panel setting voltage VPS is applied. FIGS. 10A and 10B are diagrams illustrating an example in which the panel setting voltage VPS is applied.

Referring to FIGS. 1 to 10B, the method of setting the panel voltage may include setting a first reference voltage VR1, a second reference voltage VR2 lower than the first reference voltage VR1 and higher than a panel default voltage VPD, and a reference current IR (S100), applying the first reference voltage VR1 to the pixels P (S200), obtaining a first measurement current IM1 by measuring a current of the display panel 100 generated in response to the first reference voltage VR1 (S210), comparing the first measurement current IM1 with the reference current IR (S220), obtaining a second measurement current IM2 by measuring a current of the display panel 100 generated in response to the second reference voltage VR2 when the first measurement current IM1 is greater than the reference current IR (S300), comparing the second measurement current IM2 with the reference current IR (S310), and obtaining a panel setting voltage VPS based on the first reference voltage VR1 and the second reference voltage VR2 when the second measurement current IM2 is less than or equal to the reference current IR (S400).

The method of setting the panel voltage may include setting the first reference voltage VR1, the second reference voltage VR2 lower than the first reference voltage VR1 and higher than the panel default voltage VPD, and the reference current IR (S100), applying the first reference voltage VR1 to the pixels P (S200), obtaining the first measurement current IM1 by measuring the current of the display panel 100 generated in response to the first reference voltage VR1 (S210), comparing the first measurement current IM1 with the reference current IR (S220).

For example, the driving controller 200 may control a gate-source voltage Vgs in order to minimize a leakage current Ids flowing through the third transistor T3 or the fourth transistor T4.

The first reference voltage VR1 may be a voltage for determining whether a transistor has the leakage current Ids. The first reference voltage VR1 may be a voltage used to compensate for the panel default voltage VPD when the leakage current Ids flows through the transistor.

The second reference voltage VR2 may be a voltage for determining whether the transistor has a leakage current Ids. The second reference voltage VR2 may be a voltage used to compensate for the panel default voltage VPD when the leakage current Ids flows through the transistor.

In an embodiment, the first reference voltage VR1 and the second reference voltage VR2 are voltages obtained by subtracting a voltage of the fifth electrode of the third transistor T3 from a voltage of the third gate electrode of the third transistor T3. The fifth electrode of the third transistor T3 may be the source electrode. The voltage obtained by subtracting the voltage of the fifth electrode of the third transistor T3 from the voltage of the third gate electrode of the third transistor T3 may be the gate-source voltage Vgs of the third transistor T3. Therefore, the first reference voltage VR1 and the second reference voltage VR2 may be the gate-source voltage Vgs of the third transistor T3.

In an embodiment, the first reference voltage VR1 and the second reference voltage VR2 are voltages obtained by subtracting a voltage of the seventh electrode of the fourth transistor T4 from a voltage of the fourth gate electrode of the fourth transistor T4. The seventh electrode of the fourth transistor T4 may be the source electrode. The voltage obtained by subtracting the voltage of the seventh electrode of the fourth transistor T4 from the voltage of the fourth gate electrode of the fourth transistor T4 may be the gate-source voltage Vgs of the fourth transistor T4. Therefore, the first reference voltage VR1 and the second reference voltage VR2 may be the gate-source voltage Vgs of the fourth transistor T4.

In an embodiment, the second reference voltage VR2 may be lower than the first reference voltage VR1 and higher than the panel default voltage VPD.

The reference current IR may be a current for determining whether the leakage current Ids of the transistor is generated by comparing the reference current IR with the first measurement current IM1 which is a current of the display panel 100 generated in response to the first reference voltage VR1. The reference current IR may be a current for determining whether the leakage current Ids of the transistor is generated by comparing the reference current IR with the second measurement current IM2 which is a current of the display panel 100 generated in response to the second reference voltage VR2.

In an embodiment, the method of setting the panel voltage may further include applying the panel default voltage VPD to the display panel 100 when the first measurement current IM1 is less than or equal to the reference current IR (S600).

For example, as shown in FIG. 6A, when the first measurement current IM1 is less than or equal to the reference current IR, the leakage current Ids of the transistor may be small. Therefore, the panel default voltage VPD may be applied to the display panel 100 without compensation.

The method of setting the panel voltage may include obtaining the second measurement current IM2 by measuring the current of the display panel 100 generated in response to the second reference voltage VR2 when the first measurement current IM1 is greater than the reference current IR (S300), comparing the second measurement current IM2 with the reference current IR (S310), and obtaining the panel setting voltage VPS based on the first reference voltage VR1 and the second reference voltage VR2 when the second measurement current IM2 is less than or equal to the reference current IR (S400).

The method of setting the panel voltage may further include resetting the second reference voltage VR2 when the second measurement current IM2 is greater than the reference current IR (S700).

As shown in FIGS. 6B and 6C, in a graph 60 of current versus gate-source voltage, when the gate-source voltage Vgs of the third transistor T3 or the fourth transistor T4 is a default voltage VGSD of the gate-source voltage Vgs, the leakage current Ids may flow through the third transistor T3 or the fourth transistor T4.

For example, when the first measurement current IM1 is greater than the reference current IR, the panel default voltage VPD may need to be compensated. However, as shown in FIG. 6B, when the second measurement current IM2 is greater than the reference current IR, the second reference voltage VR2 corresponding to the second measurement current IM2 may be large to be used for compensation of the panel default voltage VPD. Therefore, the second reference voltage VR2 may need to be reset.

The second reference voltage VR2 after resetting may be lower than the second reference voltage VR2 before resetting. For example, the second reference voltage VR2 before resetting may be high enough to be used for compensation of the panel basic voltage VPD, so the second reference voltage VR2 after reset may be lower than the second reference voltage VR2 before reset.

As shown in FIG. 6C, when the second measurement current IM2 is less than or equal to the reference current IR, the second reference voltage VR2 corresponding to the second measurement current IM2 is small enough to be used for the compensation of the panel default voltage VPD. Therefore, the panel setting voltage VPS may be obtained based on the first reference voltage VR1 and the second reference voltage VR2.

In an embodiment, as shown in FIG. 7, the panel setting voltage VPS may be determined by using an equation 410 "VPS=VPD−VR1+VR2". Here, VPS represents the panel setting voltage, VPD represents the panel default voltage, VR1 represents the first reference voltage, and the VR2 represents the second reference voltage. The second reference voltage VR2 may be lower than the first reference voltage VR1. Therefore, the panel setting voltage VPS may be lower than the panel default voltage VPD.

In this case, as shown in FIG. 8A, the panel setting voltage VPS may be applied to the gate electrode of the third transistor T3 or the gate electrode of the fourth transistor T4. As shown in FIG. 8B, the panel default voltage VPD may be a voltage of the second gate signal GC having a deactivation level or a voltage of the third gate signal GI having the deactivation level. That is, the voltage of the gate electrode of the third transistor T3 or the voltage of the gate electrode of the fourth transistor T4 may be changed from the panel default voltage VPD to the panel setting voltage VPS, so that the gate-source voltage Vgs of the third transistor T3 or the gate-source voltage Vgs of the fourth transistor T4 may decrease.

As such, a leakage current Ids of the pixels P when the panel setting voltage VPS is applied to the display panel 100 may be smaller than a leakage current Ids of the pixels P when the panel default voltage VPD is applied to the display panel 100.

Accordingly, an insufficient margin of the gate-source voltage Vgs of the transistor may be prevented, and even when the transistor is turned off, the leakage current Ids flowing through the transistor may be minimized, so that a display quality of the display device 10 may be enhanced.

In an embodiment, as shown in FIG. 7, the panel setting voltage VPS may be determined by using an equation 420 "VPS=VPD+VR1−VR2". Here, VPS represents the panel setting voltage, VPD represents the panel default voltage, VR1 represents the first reference voltage, and the VR2 represents the second reference voltage. Therefore, the panel setting voltage VPS may be lower than the panel default voltage VPD if VR2 is greater than VR1.

In this case, as shown in FIG. 9A, the panel setting voltage VPS may be applied to the fifth electrode of the third transistor T3. As shown in FIG. 9B, the panel default voltage VPD may be the second power supply voltage ELVSS. That is, the voltage of the fifth electrode of the third transistor T3 may be changed from the panel default voltage VPD to the panel setting voltage VPS, so that the gate-source voltage Vgs of the third transistor T3 may decrease.

As such, the leakage current Ids of the pixels P when the panel setting voltage VPS is applied to the display panel 100 may be smaller than the leakage current Ids of the pixels P when the panel default voltage VPD is applied to the display panel 100.

Accordingly, the insufficient margin of the gate-source voltage Vgs of the transistor may be prevented, and even when the transistor is turned off, the leakage current Ids flowing through the transistor may be minimized, so that the display quality of the display device 10 may be enhanced.

In some cases, as shown in FIG. 10A, the panel setting voltage VPS may be applied to the seventh electrode of the fourth transistor T4. As shown in FIG. 10B, the panel default voltage VPD may be the first initialization voltage VINT1. That is, the voltage of the seventh electrode of the fourth transistor T4 may be changed from the panel default voltage VPD to the panel setting voltage VPS, so that the gate-source voltage Vgs of the fourth transistor T4 may decrease.

As such, the leakage current Ids of the pixels P when the panel setting voltage VPS is applied to the display panel 100 may be smaller than the leakage current Ids of the pixels P when the panel default voltage VPD is applied to the display panel 100.

Accordingly, the insufficient margin of the gate-source voltage Vgs of the transistor may be prevented, and even when the transistor is turned off, the leakage current Ids flowing through the transistor may be minimized, so that the display quality of the display device 10 may be enhanced.

Figure 11:
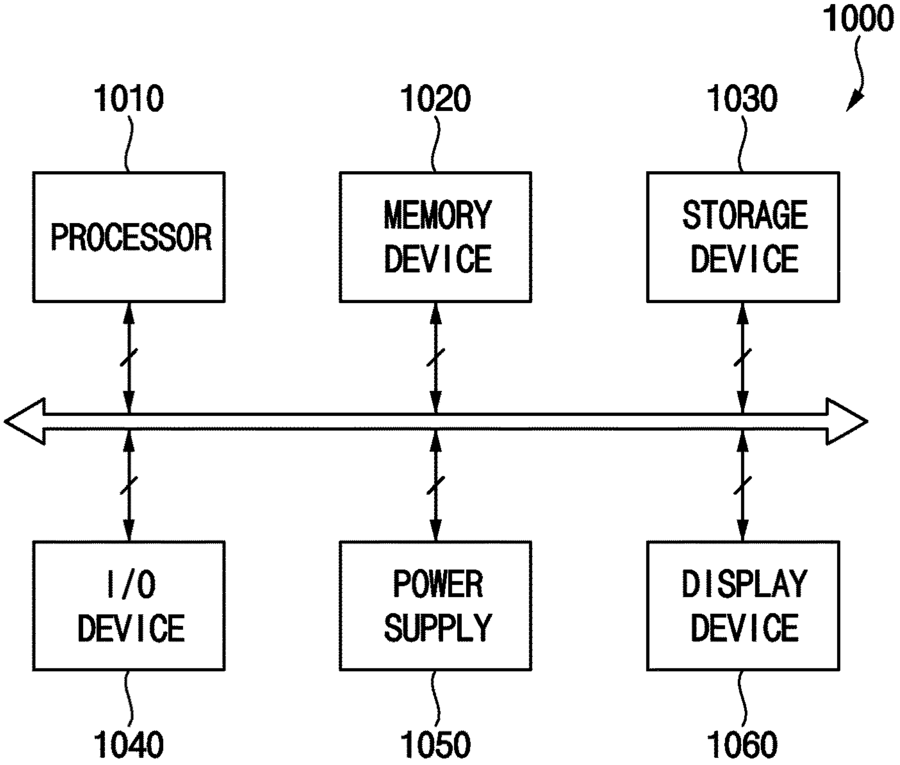
FIG. 11 is a block diagram illustrating an electronic device.
Figure 12:
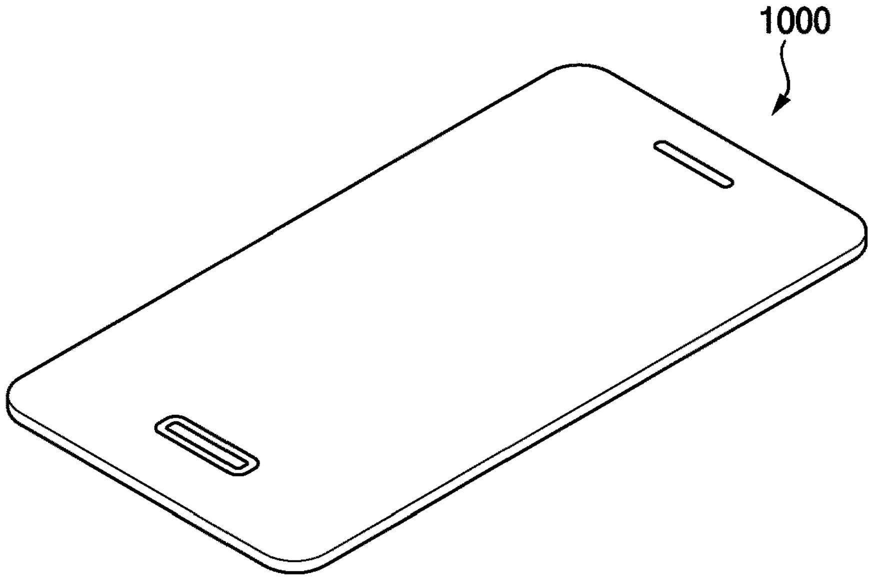
FIG. 12 is a diagram illustrating an embodiment in which the electronic device of FIG. 11 is implemented as a smart phone.

FIG. 11 is a block diagram illustrating an electronic device 1000. FIG. 12 is a diagram illustrating an embodiment in which the electronic device 1000 of FIG. 11 is implemented as a smart phone.

Referring to FIGS. 9 and 10, the electronic device 1000 may include a processor 1010, a memory device 1020, a storage device 1030, an input/output (I/O) device 1040, a power supply 1050, and a display device 1060. The display device 1060 may be the display device 10 of FIG. 1. In addition, the electronic device 1000 may further include a plurality of ports for communicating with a video card, a sound card, a memory card, a universal serial bus (USB) device, other electronic device, and the like.

In an embodiment, as illustrated in FIG. 12, the electronic device 1000 may be implemented as a smart phone. However, the electronic device 1000 is not limited thereto. For example, the electronic device 1000 may be implemented as a cellular phone, a video phone, a smart pad, a smart watch, a tablet PC, a car navigation system, a computer monitor, a laptop, a head mounted display (HMD) device, and the like.

The processor 1010 may perform various computing functions. The processor 1010 may be a micro processor, a central processing unit (CPU), an application processor (AP), and the like. The processor 1010 may be coupled to other components via an address bus, a control bus, a data bus, and the like. Further, the processor 1010 may be coupled to an extended bus such as a peripheral component interconnection (PCI) bus.

The memory device 1020 may store data for operations of the electronic device 1000. For example, the memory device 1020 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, and the like and/or at least one volatile memory device such as a dynamic random access memory (DRAM) device, a static random access memory (SRAM) device, a mobile DRAM device, and the like.

The storage device 1030 may include a solid state drive (SSD) device, a hard disk drive (HDD) device, a CD-ROM device, and the like.

The I/O device 1040 may include an input device such as a keyboard, a keypad, a mouse device, a touch-pad, a touch-screen, and the like, and an output device such as a printer, a speaker, and the like. In some embodiments, the I/O device 1040 may include the display device 1060.

The power supply 1050 may provide power for operations of the electronic device 1000.

The display device 1060 may be connected to other components through buses or other communication links.

The inventive concepts may be applied to any display device and any electronic device including the touch panel. For example, the inventive concepts may be applied to a mobile phone, a smart phone, a tablet computer, a digital television (TV), a 3D TV, a personal computer (PC), a home appliance, a laptop computer, a personal digital assistant (PDA), a portable multimedia player (PMP), a digital camera, a music player, a portable game console, a navigation device, etc.

The foregoing is illustrative of the inventive concept and is not to be construed as limiting thereof. Although a few embodiments of the inventive concept have been described, those skilled in the art will readily appreciate that many modifications are possible in the embodiments without materially departing from the novel teachings and advantages of the inventive concept. Accordingly, all such modifications are intended to be included within the scope of the inventive concept as defined in the claims. In the claims, means-plus-function clauses are intended to cover the structures described herein as performing the recited function and not only structural equivalents but also equivalent structures. Therefore, it is to be understood that the foregoing is illustrative of the inventive concept and is not to be construed as limited to the specific embodiments disclosed, and that modifications to the disclosed embodiments, as well as other embodiments, are intended to be included within the scope of the appended claims. The inventive concept is defined by the following claims, with equivalents of the claims to be included therein.

What is claimed is:

1. A method of setting a panel voltage applied to pixels of display panel, comprising:

setting a first reference voltage, a second reference voltage lower than the first reference voltage and higher than a panel default voltage, and a reference current;

applying the first reference voltage to the pixels;

obtaining a first measurement current by measuring a current of the display panel generated in response to the first reference voltage;

comparing the first measurement current with the reference current;

obtaining a second measurement current by measuring a current of the display panel generated in response to the second reference voltage when the first measurement current is greater than the reference current;

comparing the second measurement current with the reference current; and obtaining a panel setting voltage based on the first reference voltage and the second reference voltage when the second measurement current is less than or equal to the reference current, wherein each of the pixels comprises a first transistor generating a driving current based on a voltage of a second node and a third transistor diode-connecting the first transistor in response to a second gate signal, wherein the first reference voltage and the second reference voltage are a gate-source voltage of the third transistor, and the gate-source voltage of the third transistor is a voltage difference between a gate electrode of the third transistor and a source electrode of the third transistor, wherein each of the pixels further includes:

a second transistor including a second gate electrode receiving a first gate signal, a third electrode connected to a data line, and a fourth electrode connected to a first node;

a fourth transistor including a fourth gate electrode receiving a third gate signal, a seventh electrode receiving a first initialization voltage, and an eighth electrode connected to the second node;

a fifth transistor including a fifth gate electrode receiving an emission signal, a ninth electrode receiving a first power supply voltage, and a tenth electrode connected to the first node;

a sixth transistor including a sixth gate electrode receiving the emission signal, an eleventh electrode connected to a third node, and a twelfth electrode connected to a fourth node;

a seventh transistor including a seventh gate electrode receiving a fourth gate signal, a thirteenth electrode receiving a second initialization voltage, and a fourteenth electrode connected to the fourth node;

an eighth transistor including an eighth gate electrode receiving the fourth gate signal, a fifteenth electrode receiving a bias voltage, and a sixteenth electrode connected to the first node;

a storage capacitor including a seventeenth electrode receiving the first power supply voltage and an eighteenth electrode connected to the second node; and a light emitting element including a nineteenth electrode connected to the fourth node and a twentieth electrode receiving a second power supply voltage lower than the first power supply voltage, wherein the first transistor includes a first electrode connected to the first node, a first gate electrode connected to the second node, and a second electrode connected to the third node, and wherein the third transistor includes a third gate electrode receiving the second gate signal, a fifth electrode connected to the third node, and a sixth electrode connected to the second node.

2. The method of claim 1, wherein a leakage current of the pixels when the panel setting voltage is applied to the display panel is smaller than a leakage current of the pixels when the panel default voltage is applied to the display panel.

3. The method of claim 1, further comprising:

applying the panel default voltage to the display panel when the first measurement current is less than or equal to the reference current.

4. The method of claim 1, further comprising:

resetting the second reference voltage when the second measurement current is greater than the reference current.

5. The method of claim 4, wherein the second reference voltage after resetting is lower than the second reference voltage before resetting.

6. The method of claim 1, wherein the third transistor and the fourth transistor are n-channel metal oxide semiconductor (NMOS) transistors.

7. The method of claim 6, wherein the first reference voltage and the second reference voltage are voltages obtained by subtracting a voltage of the fifth electrode of the third transistor from a voltage of the third gate electrode of the third transistor.

8. The method of claim 6, wherein the first reference voltage and the second reference voltage are voltages obtained by subtracting a voltage of the seventh electrode of the fourth transistor from a voltage of the fourth gate electrode of the fourth transistor.

9. The method of claim 6, wherein the panel setting voltage is determined by using an equation VPS=VPD−VR1+VR2, where VPS represents the panel setting voltage, VPD represents the panel default voltage, VR1 represents the first reference voltage, and VR2 represents the second reference voltage.

10. The method of claim 9, wherein the panel setting voltage is applied to one of the third gate electrode and the fourth gate electrode.

11. The method of claim 10, wherein the panel default voltage is a voltage of the second gate signal having a deactivation level or a voltage of the third gate signal having the deactivation level.

12. The method of claim 6, wherein the panel setting voltage is determined by using an equation VPS=VPD+VR1−VR2, where VPS represents the panel setting voltage, VPD represents the panel default voltage, VR1 represents the first reference voltage, and VR2 represents the second reference voltage.

13. The method of claim 12, wherein the panel setting voltage is applied to the fifth electrode of the third transistor.

14. The method of claim 13, wherein the panel default voltage is the second power supply voltage.

15. The method of claim 12, wherein the panel setting voltage is applied to the seventh electrode of the fourth transistor.

16. The method of claim 15, wherein the panel default voltage is the first initialization voltage.

17. A display device comprising:

a display panel including pixels; and a display panel driver configured to set a first reference voltage, a second reference voltage lower than the first reference voltage and higher than a panel default voltage, and a reference current, to apply the first reference voltage to the pixels, to obtain a first measurement current by measuring a current of the display panel generated in response to the first reference voltage, to compare the first measurement current with the reference current, to obtain a second measurement current by measuring a current of the display panel generated in response to the second reference voltage when the first measurement current is greater than the reference current, to compare the second measurement current with the reference current, and to obtain a panel setting voltage based on the first reference voltage and the second reference voltage when the second measurement current is less than or equal to the reference current, wherein each of the pixels comprises a first transistor generating a driving current based on a voltage of a second node and a third transistor diode-connecting the first transistor in response to a second gate signal, wherein the first reference voltage and the second reference voltage are a gate-source voltage of the third transistor, and the gate-source voltage of the third transistor is a voltage difference between a gate electrode of the third transistor and a source electrode of the third transistor, wherein each of the pixels further includes:

a second transistor including a second gate electrode receiving a first gate signal, a third electrode connected to a data line, and a fourth electrode connected to a first node;

a fourth transistor including a fourth gate electrode receiving a third gate signal, a seventh electrode receiving a first initialization voltage, and an eighth electrode connected to the second node;

a fifth transistor including a fifth gate electrode receiving an emission signal, a ninth electrode receiving a first power supply voltage, and a tenth electrode connected to the first node;

a sixth transistor including a sixth gate electrode receiving the emission signal, an eleventh electrode connected to a third node, and a twelfth electrode connected to a fourth node;

a seventh transistor including a seventh gate electrode receiving a fourth gate signal, a thirteenth electrode receiving a second initialization voltage, and a fourteenth electrode connected to the fourth node;

an eighth transistor including an eighth gate electrode receiving the fourth gate signal, a fifteenth electrode receiving a bias voltage, and a sixteenth electrode connected to the first node;

a storage capacitor including a seventeenth electrode receiving the first power supply voltage and an eighteenth electrode connected to the second node; and a light emitting element including a nineteenth electrode connected to the fourth node and a twentieth electrode receiving a second power supply voltage lower than the first power supply voltage, wherein the first transistor includes a first electrode connected to the first node, a first gate electrode connected to the second node, and a second electrode connected to the third node, and wherein the third transistor includes a third gate electrode receiving the second gate signal, a fifth electrode connected to the third node, and a sixth electrode connected to the second node.

18. The display device of claim 17, wherein a leakage current of the pixels when the panel setting voltage is applied to the display panel is smaller than a leakage current of the pixels when the panel default voltage is applied to the display panel.

19. An electronic device comprising:

a display panel including pixels;

a display panel driver configured to set a first reference voltage, a second reference voltage lower than the first reference voltage and higher than a panel default voltage, and a reference current, to apply the first reference voltage to the pixels, to obtain a first measurement current by measuring a current of the display panel generated in response to the first reference voltage, to compare the first measurement current with the reference current, to obtain a second measurement current by measuring a current of the display panel generated in response to the second reference voltage when the first measurement current is greater than the reference current, to compare the second measurement current with the reference current, and to obtain a panel setting voltage based on the first reference voltage and the second reference voltage when the second measurement current is less than or equal to the reference current; and a processor configured to control the display panel driver, wherein each of the pixels comprises a first transistor generating a driving current based on a voltage of a second node and a third transistor diode-connecting the first transistor in reply to a second gate signal, wherein the first reference voltage and the second reference voltage are a gate-source voltage of the third transistor, and the gate-source voltage of the third transistor is a voltage difference between a gate electrode of the third transistor and a source electrode of the third transistor, wherein each of the pixels further includes:

a second transistor including a second gate electrode receiving a first gate signal, a third electrode connected to a data line, and a fourth electrode connected to a first node;

a fourth transistor including a fourth gate electrode receiving a third gate signal, a seventh electrode receiving a first initialization voltage, and an eighth electrode connected to the second node;

a fifth transistor including a fifth gate electrode receiving an emission signal, a ninth electrode receiving a first power supply voltage, and a tenth electrode connected to the first node;

a sixth transistor including a sixth gate electrode receiving the emission signal, an eleventh electrode connected to a third node, and a twelfth electrode connected to a fourth node;

a seventh transistor including a seventh gate electrode receiving a fourth gate signal, a thirteenth electrode receiving a second initialization voltage, and a fourteenth electrode connected to the fourth node;

an eighth transistor including an eighth gate electrode receiving the fourth gate signal, a fifteenth electrode receiving a bias voltage, and a sixteenth electrode connected to the first node;

a storage capacitor including a seventeenth electrode receiving the first power supply voltage and an eighteenth electrode connected to the second node; and a light emitting element including a nineteenth electrode connected to the fourth node and a twentieth electrode receiving a second power supply voltage lower than the first power supply voltage, wherein the first transistor includes a first electrode connected to the first node, a first gate electrode connected to the second node, and a second electrode connected to the third node, and wherein the third transistor includes a third gate electrode receiving the second gate signal, a fifth electrode connected to the third node, and a sixth electrode connected to the second node.

* * * * *